(12) United States Patent
Kress et al.

(10) Patent No.: US 8,919,699 B2
(45) Date of Patent: Dec. 30, 2014

(54) EMERGENCY OPENING SYSTEM OF AN AIRCRAFT CABIN DOOR

(71) Applicant: Airbus Helicopters Deutschland GmbH, Donauworth (DE)

(72) Inventors: Denis Kress, Amberg (DE); Claus Pichlmaier, Bodenkirchen (DE); Marc Kirchner, Donauworth (DE); Christian Wolf, Neu-Ulm (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 99 days.

(21) Appl. No.: 13/796,525

(22) Filed: Mar. 12, 2013

(65) Prior Publication Data
US 2013/0256458 A1    Oct. 3, 2013

(30) Foreign Application Priority Data
Mar. 27, 2012    (EP) .................................... 12400008

(51) Int. Cl.
*B64C 1/14*    (2006.01)
(52) U.S. Cl.
CPC .............. *B64C 1/1423* (2013.01); *B64C 1/1407* (2013.01); *B64C 1/143* (2013.01)
USPC .......... 244/129.5; 244/129.4; 49/246; 91/402
(58) Field of Classification Search
USPC ............................................ 244/129.5, 129.4
See application file for complete search history.

(56) References Cited

U.S. PATENT DOCUMENTS

| 4,453,684 | A | * | 6/1984 | Hanks ......................... 244/129.5 |
| 4,720,065 | A | * | 1/1988 | Hamatani .................. 244/129.5 |
| 5,156,359 | A | * | 10/1992 | Noble et al. ............... 244/129.4 |

(Continued)

FOREIGN PATENT DOCUMENTS

| DE | 4022067 A1 | 1/1992 |
| DE | 10161562 A1 | 7/2003 |
| DE | 10258105 A1 | 7/2004 |
| DE | 102008014691 A1 | 10/2009 |

OTHER PUBLICATIONS

Search Report and Written Opinion; Application No. EP 12400008; dated Oct. 2, 2012.

*Primary Examiner* — Christopher P Ellis
*Assistant Examiner* — Medhat Badawi
(74) *Attorney, Agent, or Firm* — Brooks Kushman P.C.

(57) ABSTRACT

An emergency opening system (1) of an aircraft cabin door (3) mounted in an aircraft fuselage structure (4) by means of a hinge arm (2). An actuator (7), designed to assist the opening of the aircraft cabin door (3) against the force of gravity by means of a gas operated actuating rod (8) is mounted with its fix end (9) to said hinge arm (2) and said actuating rod (8) is connected to an actuator joint (10). A fork lever (24) is linked to said actuator joint (10). A bell crank (13) is respectively pivotable mounted to said hinge arm (2) and to said actuator joint (10) for the fork lever (24). At least one coupling lever (12) is pivotable joint to said fork lever (24) at at least one coupling joint (14). Said at least one coupling lever (12) is mounted in at least one hinge (18) of the hinge arm (2) by means of a respective bolt (26), said bolt (26) being drivingly connected to said aircraft cabin door (3) for rotation of said aircraft cabin door (3).

3 Claims, 1 Drawing Sheet

(56) References Cited

U.S. PATENT DOCUMENTS

| | | | | |
|---|---|---|---|---|
| 5,163,639 A | * | 11/1992 | Herrmann et al. | 244/129.5 |
| 5,379,971 A | * | 1/1995 | Kim et al. | 244/129.5 |
| 5,931,415 A | * | 8/1999 | Lingard et al. | 244/129.5 |
| 6,685,139 B2 | * | 2/2004 | Blum et al. | 244/129.5 |
| 6,866,227 B2 | * | 3/2005 | Pratt et al. | 244/129.4 |
| 6,997,414 B2 | * | 2/2006 | Paradis | 244/129.5 |
| 7,168,659 B2 | * | 1/2007 | Galvani et al. | 244/129.5 |
| 7,255,376 B2 | * | 8/2007 | Pratt et al. | 292/201 |
| 7,357,354 B2 | * | 4/2008 | Mortland | 244/129.5 |
| 7,578,475 B2 | * | 8/2009 | Pratt et al. | 244/129.4 |
| 7,578,476 B2 | * | 8/2009 | Wiers et al. | 244/129.5 |
| 8,434,265 B1 | * | 5/2013 | Campbell et al. | 49/250 |
| 8,596,577 B2 | * | 12/2013 | Berkenhoff et al. | 244/118.1 |
| 2002/0139897 A1 | * | 10/2002 | Erben et al. | 244/129.5 |
| 2003/0132347 A1 | * | 7/2003 | Blum et al. | 244/129.5 |
| 2006/0202087 A1 | * | 9/2006 | Mortland | 244/129.5 |
| 2007/0095985 A1 | * | 5/2007 | Wiers et al. | 244/129.5 |
| 2008/0054123 A1 | * | 3/2008 | French et al. | 244/129.5 |
| 2011/0131986 A1 | * | 6/2011 | Andres et al. | 60/632 |

* cited by examiner

EMERGENCY OPENING SYSTEM OF AN AIRCRAFT CABIN DOOR

CROSS-REFERENCE TO RELATED APPLICATIONS

This application claims priority to European patent application 12 400008.4 filed on Mar. 27, 2012, the content of which is incorporated in its entirety by reference herein.

BACKGROUND OF THE INVENTION (1) Field of the Invention

The invention is related to an emergency opening system of an aircraft cabin door with the features of the preamble of claim 1.

(2) Description of Related Art

Aircraft doors fulfill the following major functions: They provide access for the passengers and for the crew to the aircraft cabin and allow the evacuation of the aircraft cabin in an emergency case. Additionally the doors also carry, unfold and inflate a slide used to evacuate the passengers from the aircraft in case of an emergency. EASA CS 25.807 differs between different types of emergency exits for passenger aircrafts with regard to capacity of passengers.

For type A doors a maximum of 110 passengers are allowed and for type B doors 75 passengers are allowed (FAR 25.807). Within a given evacuation time of 90 seconds the given number of passengers/crew members shall be able to leave the aircraft. For this purpose typical aircraft doors are designed in such a way that the door opening—including inflation of the slide—is performed in not more than 10 seconds. Different means of power assisted opening devices are used to allow a rapid door opening. Basically a translational or a rotary power opening device can be used. The majority of all aircraft doors use a pneumatic axial cylinder as a working element and a pressure pot as energy storage. Alternatively a mechanical spring can be used as energy storage and a simple linear slide can be used as a working element. Rotary systems use a condenser as energy storage and an electric drive. Alternatively gas motor systems are known which use an explosive as energy storage.

A 'Pneumatic Actuator' system is used to assist the rapid door opening and to provide enough force to drop the slide from its packed position on the door. State-of-the-art aircraft doors follow the principle of initial inward movement. The basic opening motion (swivel) is provided by the coupling-curve of a four-joint-gear. The gear is realized by two levers (parallel lever and hinge arm) and the door leaf as linkage. Typically the pneumatic actuator is located parallel to one lever of the four-joint-gear. Another mechanical element is used to transfer its axial force into the passenger door structure. The power actuator pushes the door from its unlocked, unlatched, lifted but closed position to its open position. The push-actuation mode creates discrete forces in the passenger door structure. Especially in case of a blockage during the power assisted opening the door structure has to carry discrete forces without damage. These discrete forces may be a problem for certain door system layouts, especially for door structures made from Carbon Fibre Reinforced Plastic (CFRP).

According to document DE 101 61 562 B4 existing aircraft doors use a pneumatic cylinder (working element) together with a pressure pot (energy storage). A door latching requires a z-movement of a door leaf of an aircraft cabin door. A mechanical element is connected in a rotatable way to the cabin door as well as to the power opening. Since the distance to this element changes during the lift motion the mechanical element is realized as telescopic rod used to compensate the door z-movement during its opening cycle and to introduce the actuator forces into the door leaf. The door leaf distributes the forces to different bearing points.

One bearing point is the pivot point of the parallel levers in the top of the door. The other bearing point is the mechanical connection of the connecting links to the door. The working element is positioned parallel to the hinge arm as a lever of a so-called "four-joint-gear". This arrangement creates the following load path: The source of the force is the actuator which changes the pressure energy into an axial force. This force will be applied to a telescopic rod and acts on the door leaf.

The actuator load acting on the door leaf creates a load path via the connecting links and the hinge arm back to the origin of the force. A major disadvantage of this system is the introduction of a discrete load into the door leaf, especially a discrete load with a z-component if the door is closed and the actuator is under power, i. e. a typical case of misuse. A further disadvantage is the length of the load path, the usage of the telescopic rod system and the application of the z-load-component. Especially in a CFRP door the local introduction of a high force causes the need for local reinforcements. These reinforcements are typically made from titanium and create high cost and extra weight.

The coupling of the swivel and the lift system and the application of a telescopic rod create another major disadvantage with respect to the basic kinematic system. Generally the system is in a non-defined status as a movement in the telescopic rod can be initiated by the lift or the swivel motion or a mix of both. The system is defined if preconditions, such as extra boundary conditions are fulfilled. Such preconditions are as follows: the telescopic rod is fully compressed and blocked by a physical stop; the telescopic rod is fully extended and blocked by a physical stop. In order to make the intermediate condition between compressed and extended condition predictable a spring unit is required.

The disadvantage based on the fact that the system status is generally non-defined is that the system design process is complex and requests iterative loops to deliver a properly working unit. In addition it is known from previous designs that the non-defined status is also critical at the end of a door emergency opening motion. Before the door reaches its end position the system needs to be decelerated. The non-defined nominal status, caused by the spring loaded telescopic rod, complicates the controlled deceleration of the door, i. e. damping device.

Alternatively to a pressure pot mechanical springs are used as energy storage and a linear slide provides the axial force at the place of a pneumatic cylinder as working element. A major disadvantage is the 'energy density' in the mechanical springs. If the springs are made from metal the system is not competitive in comparison to the existing solutions. If the system uses CFRP spring elements the technical challenge is even higher and evidence is required that no creeping effect will decrease the single spring force during the lifetime of the pneumatic actuator system.

The document DE 102 58 105 B4 discloses a rotary electric motor system, i. e. a motor+constant gear, arranged in such a way that any acting torsion moment is created by an electrical engine and applied directly in the rotation axis of the system. The passenger door uses a four-joint-gear as basic swivel kinematics. The drive for this kinematic system is provided by the electrical engine. This engine includes the constant gear to adjust the force as well as the opening time. The motor applies its opening moment directly into the rotational axis (main rotation axis) of the system so that the door is no longer pushed to open but is rotated to open. This rotary electric motor system has been developed for a day to day application of a big and heavy door, i. e. the door movement is power assisted at any time.

In case of an emergency opening the power level is increased so that the full door movement is achieved by the system. There are consequences for this rotary electric motor system with regard to durability and the weight of the energy storage as well as with regard to the reactive-moments. Since all the opening torque is provided by only one axis again a situation of local load concentration comes into existence. In the end heavy and costly brackets are required to react the torsion moment. In addition to that the motor-gear unit consumes a lot of volume in a volume-sensitive area of the door-system.

The document DE 10 2008 014 691 A1 discloses a rotary gas motor system together with an explosive. Instead of a condenser the system is powered by an explosive. The explosive material reacts relatively slowly so that energy in the form of expanding gas volume is produced over the opening time. The expanding gas is transferred via a gas engine and a gear into a torsion moment. The gas motor is arranged so that the torsion moment acts directly on the rotation axis of the swivel system. The gas motor systems also suffer from the limited available space as well as from reacting torsion moments. The acceptance by airliners and/or by passengers of explosives in an aircraft cabin has to be seen as critical. In addition to that it is known from other industries that the spare-logistics for explosive material are difficult and costly.

The document U.S. Pat. No. 5,379,971 shows a chain system which is powered by a pneumatic linear actuator. The system combines the pneumatic linear working element with a rotary opening of the door. The chain system shows advantages from the point of load introduction. The torsion moment is applied symmetrically via two axes. But the chain system in total uses a high number of single parts and thus it is heavy, expensive and difficult to maintain.

The document DE 4022067 C2 proposes to use a rotary motor system external from the door system which is accommodated in the airframe. To open an air cabin door from outside the airframe may be seen as advantageous form a product side. But from a technical administration point of view a high number of internal interfaces are created. These interfaces are difficult to manage before the systems reach an acceptable level of performance. In addition to that it is known from previous aircraft developments that the available space in the area of the door surrounding is also extremely limited.

The object of the invention is to provide an emergency opening system for an aircraft cabin door that avoids or reduces discrete forces to an aircraft cabin door as a result from power assisted door opening.

BRIEF SUMMARY OF THE INVENTION

The solution is provided with an emergency opening system of an aircraft cabin door with the features of claim 1. Preferred embodiments of the invention are presented with the subclaims.

According to the invention an emergency opening system of an aircraft cabin door is mounted in an aircraft fuselage structure and comprises a flexed, stiff hinge arm being at a fuselage flank pivotable supported in said aircraft fuselage structure. Said aircraft cabin door is pivotable supported by said flexed hinge arm at a door flank opposed to said fuselage flank of the flexed hinge arm.

An actuator, namely a linear, power cylinder is designed to assist the opening of the aircraft cabin door against the force of gravity by means of a gas operated actuator, e. g. an actuating rod. Said power cylinder is mounted with its fix end to said fuselage flank of the flexed hinge arm and said actuating rod is oriented essentially parallel to said door flank of the flexed hinge arm. Said actuating rod is connected to an actuator joint of a four joint gear for driving a fork lever of said four joint gear linked to said actuator joint. A bell crank of said four joint gear is pivotable mounted to a hinge joint of said four joint gear, said hinge joint being fixed to said door flank of the stiff hinge arm. The bell crank is pivotable mounted to said actuator joint for the drivable fork lever.

The inventive emergency opening system is provided with at least one coupling lever of said four joint gear, said at least one coupling lever being pivotable joint to said drivable fork lever at one of the at least one coupling joint and said at least one coupling lever being mounted in at least one hinge of said four joint gear of the hinge arm by means of a respective torsion bolt, said torsion bolt being drivingly connected to said aircraft cabin door for rotation of said aircraft cabin door relative to the hinge arm and relative to the aircraft fuselage structure.

The invention provides a new architecture for emergency opening systems with two fully independent systems: First a system comprising the door structure together with the door mechanism which moves in z-direction, i. e. essentially vertical to a longitudinal axis of the aircraft, to provide the door opening and second the hinge/emergency exit system which moves in a horizontal plane to swivel the door. The emergency opening load is no longer distributed through the door. With this new architecture less parts are affected by the emergency opening force from the actuator and less parts need to be sized to the load level of the actuator.

A CFRP door structure according to the invention allows deletion of a number of parts which would according to the state of the art be required to distribute the actuator load into the door structure, e. g. according to the invention the telescopic actuating rod including a spring unit is obsolete. The architecture of the inventive emergency opening system allows the design and sizing of the door lift system independent from the door swivel system and consequently the system design process is simplified.

To open (swivel) the door of the inventive emergency opening system by rotation instead of a translation is advantageous. The linear forces of a linear pneumatic actuator of the inventive emergency opening system are transformed into a rotational moment at torsion bolts being drivingly connected to said aircraft cabin door at a main rotation axis between said hinge arm and connecting links. The invention provides a new four-joint-gear arranged between a piston-head of the linear actuator and the main rotation axis and the piston of the actuator are connected directly via a lever. The lever transforms the axial force into a rotational moment. The new four-joint-gear allows a maximum active lever length to create the maximum rotational moment for the opening of the aircraft cabin door along the opening motion angle of typically 130° between a longitudinal axis of the airplane, the so called x-axis, and the hinge arm.

According to a preferred embodiment of the invention the fork lever is provided with two brackets and respective coupling levers are pivotable joint to said fork shaped lever at respective coupling joints and said respective coupling levers are mounted in respective hinges of the hinge arm by means of the respective torsion bolts. The fork shaped lever of the invention allows application of the rotational moment at two different positions of the same main rotation axis and thus only half of the rotational moment is effective at each of said two different positions. The two positions are the torsion bolts which are used to connect the aircraft cabin door via connecting links to the hinge arm.

According to a further preferred embodiment of the invention the fork-shaped lever is provided with two free rotational degrees of freedom (DOF) to allow adjustment of the system to minimal deviations from the nominal main rotation axis in case of tolerances with the single parts or in case of deformations of the hinge arm.

BRIEF DESCRIPTION OF THE SEVERAL VIEWS OF THE DRAWINGS

A preferred embodiment of the invention is presented with reference to the following description and the attached drawings.

DETAILED DESCRIPTION OF THE INVENTION

Figure 1:
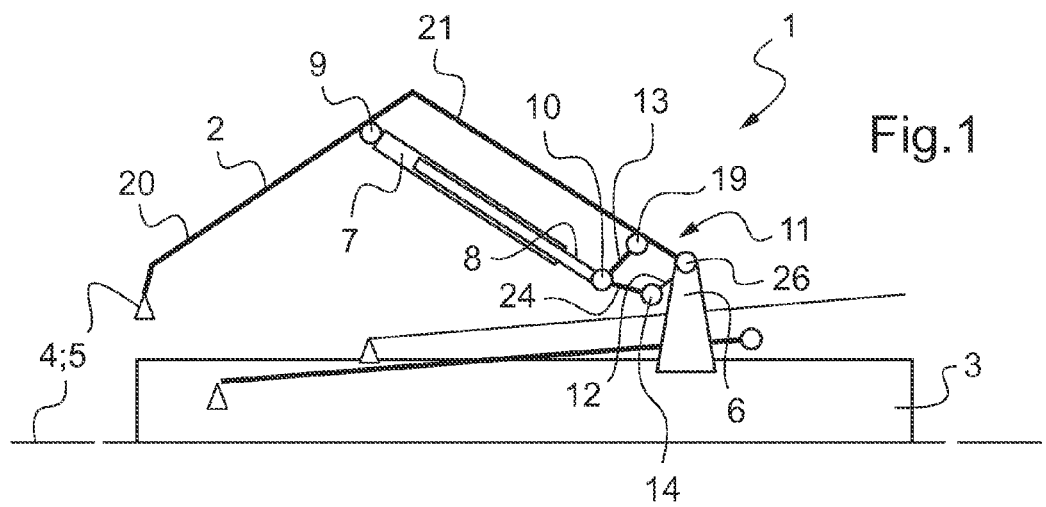
FIG. 1 shows a schematic lay out of an emergency opening system of an aircraft cabin door according to the invention.

According to FIG. 1 an emergency opening system 1 of an aircraft cabin door 3 is mounted by means of a stiff hinge arm 2 to an aircraft fuselage structure 4. The hinge arm 2 is flexed with a fuselage flank 20 and a door flank 21. The hinge arm 2 is provided with bearings 5 at the fuselage flank 20 to pivotable support the hinge arm 2 relative to said aircraft fuselage structure 4. Said aircraft cabin door 3 is pivotable supported at said hinge arm 2 by means of torsion bolts 26 at door flank 21 of the hinge arm 2. Connection links 6 connect the aircraft cabin door 3 to the torsion bolts 26.

An actuator 7, such as a linear, power cylinder, comprises a gas operated actuating, telescopic rod 8. Said power cylinder 7 is mounted with its fix end 9 to said fuselage flank 20 of said hinge arm 2 and said actuating rod 8 is connected to an actuator joint 10 of a four joint gear 11. The actuator 7 is oriented essentially parallel along most of the door flank 21.

A fork lever 24 is linked to said actuator joint 10 of the four joint gear 11. A bell crank 13 is respectively pivotable mounted to said stiff hinge arm 2 with a first end at a hinge joint 19 and with a second end to said actuator joint 10 for the fork lever 24 of the four joint gear 11.

Coupling levers 12 of the four joint gear 11 are pivotable joint to said fork lever 24 at coupling joints 14. Said coupling levers 12 are mounted in hinges (see FIG. 2) of the hinge arm 2 by means of the respective torsion bolts 26. The respective bolts 26 are integral with their associated coupling levers 12 and a rotation of the coupling levers 12 is translated to a rotation of the respective torsion bolts 26 relative to the hinges 18 of hinge arm 2.

Figure 2:
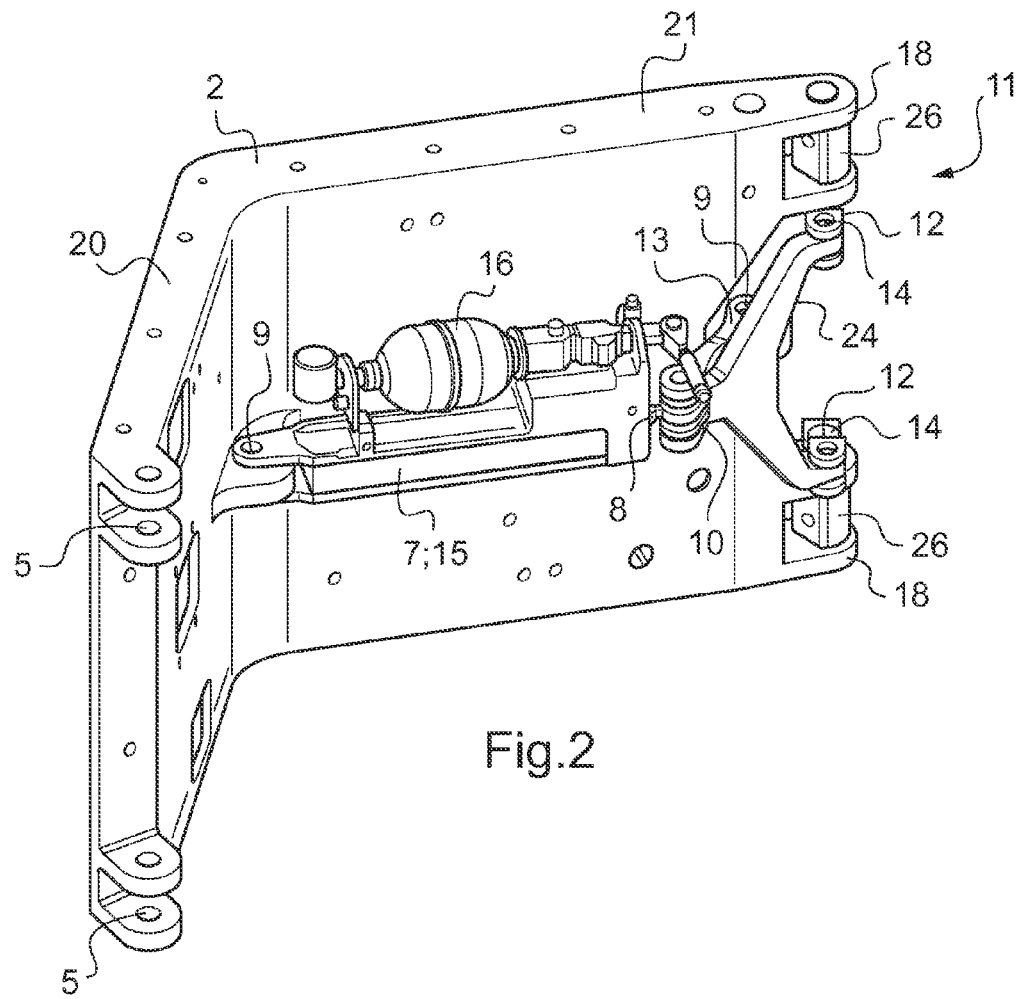
FIG. 2 shows a spherical view of an emergency opening system of an aircraft cabin door according to the invention.

According to FIG. 2 corresponding features are referred to with the references of FIG. 1. The hinge arm 2 is provided with two separated bearings 5 at the fuselage flank 20 to pivotable support the hinge arm 2 at the aircraft fuselage structure 4. The aircraft cabin door 3 (see FIG. 1) is pivotable supported by said hinge arm 2 by means of two separated torsion bolts 26 at the door flank 21 of the hinge arm 2.

The actuator 7 comprises a pneumatic cylinder 15 with the actuating, telescopic rod 8. A pressure pot 16 is connected to said power cylinder 7 for supply of pressurized air to said power cylinder 7. The fork lever 24 is provided with two brackets and two separated coupling levers 12 are pivotable joint to opposed ends of said fork shaped lever 24 at the two respective separate coupling joints 14. Said two respective coupling levers 12 are mounted in the respective hinges 18 of the hinge arm 2 by means of the two respective torsion bolts 26.

Consequent to an operation of a control pressurized air is supplied from the pressure pot 16 to said power cylinder 7 and said actuating rod 8 is pushed towards the actuator joint 10 of the four-joint gear 11 to move the fork lever 24 of the four joint gear 11 towards the coupling joints 14 with the coupling levers 12. The actuator joint 10 moves along a circular path, said circular path being imposed by the bell crank 13 rotating around hinge joint 19. The two coupling joints 14 move along a circular path, said circular path being imposed by the coupling levers 12 rotating around the two separate torsion bolts 26 in the respective hinges 18. As each of the two coupling levers 12 is integral with one of the two torsion bolts 26, a movement of the actuating rod 8 rotates the respective torsion bolts 26 relative to the hinges 18.

The fork-shaped lever 24 is provided with two free rotational degrees of freedom (DOF) to allow adjustment of the system to minimal deviations from the nominal main rotation axis in case of tolerances with the single parts or in case of deformations of the hinge arm 2.

Method of Operating the Emergency Opening System 1:

After releasing the pneumatic actuator 7 by means of the control force is applied by the actuator rod 8 on the actuator joint 10 of the four-joint-gear 11. The actuator joint 10 drives the fork lever 24 and the output of the fork lever 24 provides the rotation of the coupling levers 12, said rotation being directly transformed to rotation of the torsion bolts 26 held in the hinges 18 of the hinge arm 2 to create a rotational moment as output. This rotational moment is used as a drive for the swivel motion of the aircraft cabin door 3 with the swivel motion being the coupling curve of another four-joint-gear comprising the hinge arm 2, parallel levers, i. e. the connecting links 6 and a door leaf of the aircraft cabin door 3. With the help of the fork-lever 24 the force from the pneumatic actuator 7 is distributed into the two torsion bolts 26, namely two separated locations of the drive of the aircraft cabin door 3. Thus the input force on its way to the aircraft cabin door 3 is split into half. The rotational moments from the torsion bolts 26 are transmitted directly to the connection links 6 between hinge arm 2 and the aircraft cabin door 3, but on a minimized load level.

REFERENCE LIST 1 emergency opening system
2 hinge arm
3 aircraft cabin door
4 aircraft fuselage structure
5 bearings
6 connection links
7 actuator
8 actuating, telescopic rod
9 fix end
10 actuator joint
11 four-joint gear
12 coupling lever
13 bell crank
14 coupling joint
15 pneumatic cylinder
16 pressure pot
18 hinge
19 hinge joint
20 fuselage flank
21 door flank
24 fork-shaped lever
26 torsion bolts

What is claimed is:

1. An emergency opening system of an aircraft cabin door mounted in an aircraft fuselage structure comprising
   a stiff hinge arm being at a fuselage flank pivotable supported in said aircraft fuselage structure, said aircraft cabin door being pivotable supported by said hinge arm at a door flank of the hinge arm,
   an actuator, designed to assist the opening of the aircraft cabin door against the force of gravity by means of a gas operated actuating rod, said actuator being mounted with its fix end to said hinge arm and said actuating rod being connected to an actuator joint of a four joint gear,
   a drivable fork lever of said four joint gear linked to said actuator joint, and
   a bell crank of said four joint gear being respectively pivotable mounted to said stiff hinge arm and to said actuator joint, wherein
   the four joint gear is provided with at least one coupling lever and at least one coupling joint, said at least one coupling lever being rotatable joint to said fork lever at said at least one coupling joint and said at least one coupling lever being mounted in at least one hinge of the stiff hinge arm by means of at least one torsion bolt of said four joint gear, said at least one torsion bolt being drivingly connected to said aircraft cabin door for rotation of said aircraft cabin door.

2. The emergency opening system according to claim 1, wherein the fork lever is provided with two brackets and the respective coupling levers are rotatable joint to one of the two brackets of said fork lever at the respective coupling joints and said respective coupling levers are mounted in respective hinges of the hinge arm by means of two torsion bolts.

3. The emergency opening system according to claim 2, wherein the fork lever is provided with two free rotational DOF.

* * * * *